Figure 1:
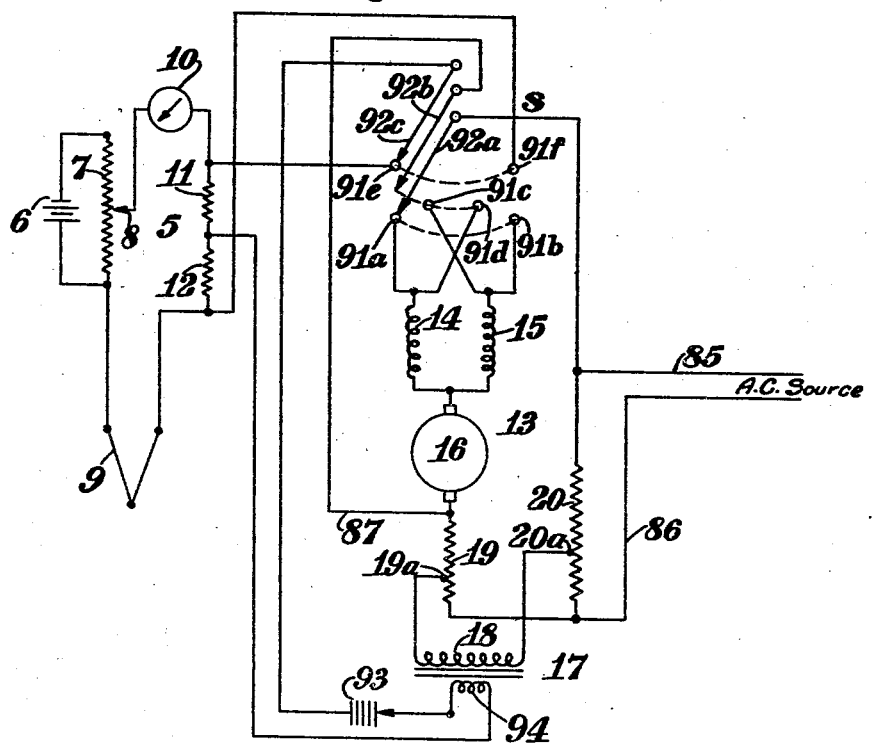

Dec. 31, 1935.  K. H. HUBBARD  2,025,749
MOTOR CONTROL SYSTEM
Filed Feb. 17, 1933  3 Sheets-Sheet 1

INVENTOR
*Karl H. Hubbard*
BY
*D. Clyde Jones*
ATTORNEY

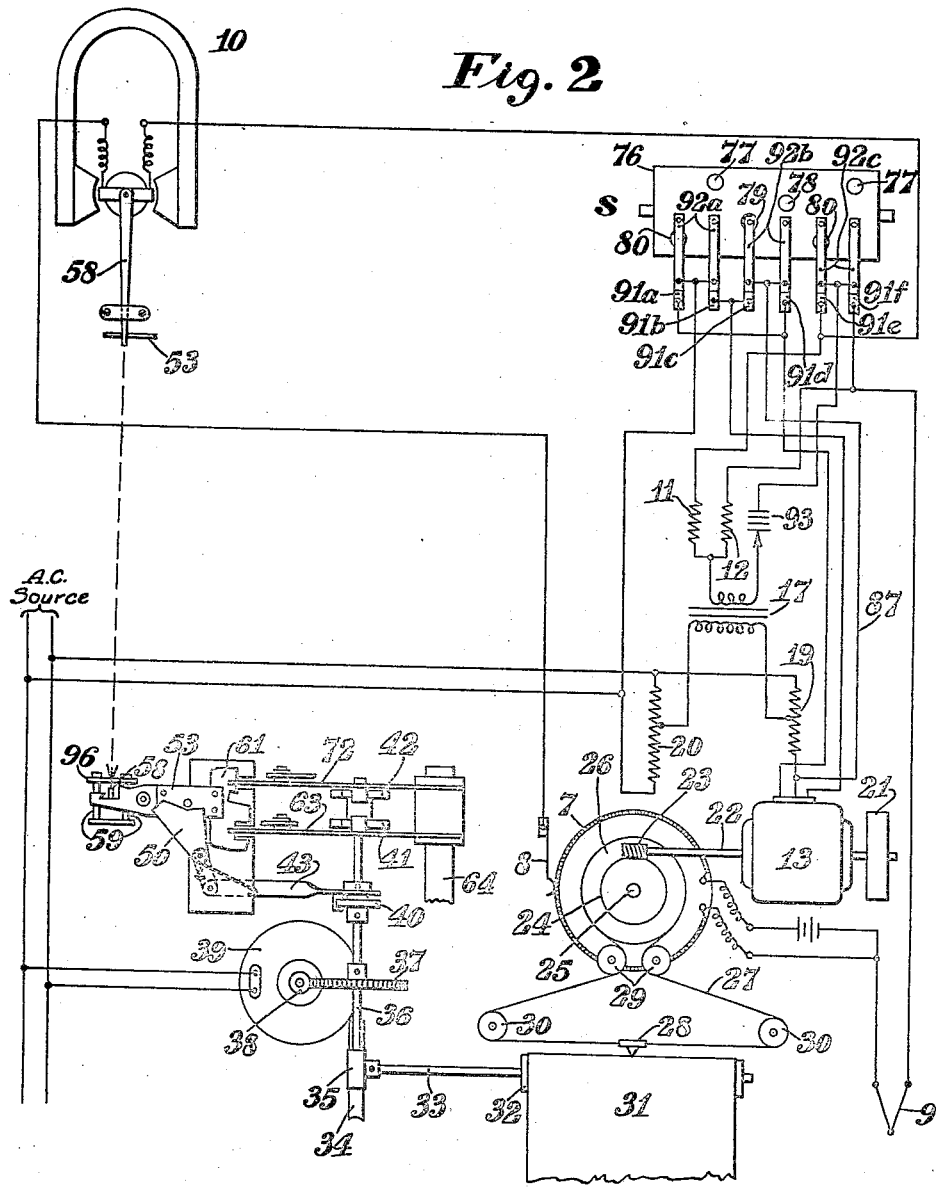

Dec. 31, 1935.　　　　K. H. HUBBARD　　　　2,025,749
MOTOR CONTROL SYSTEM
Filed Feb. 17, 1933　　　　3 Sheets-Sheet 3
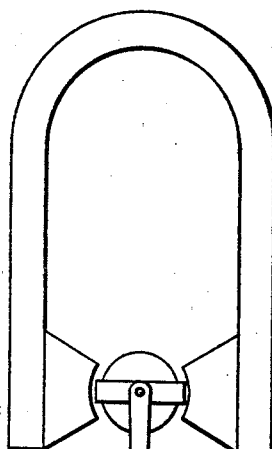
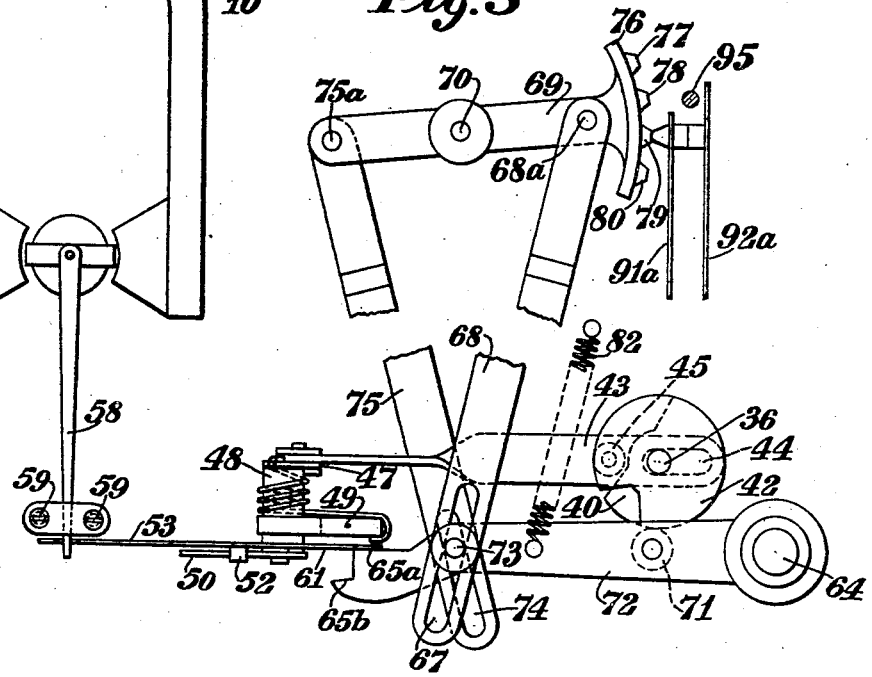
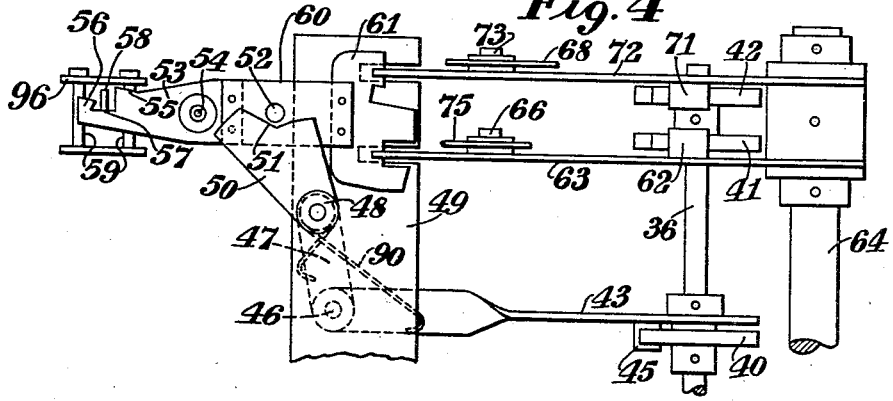
INVENTOR
*Karl H. Hubbard*
BY
*D. Clyde Jones*
ATTORNEY Patented Dec. 31, 1935

2,025,749

UNITED STATES PATENT OFFICE 2,025,749

MOTOR CONTROL SYSTEM

Karl H. Hubbard, Rochester, N. Y., assignor to Taylor Instrument Companies, Rochester, N. Y., a corporation of New York Application February 17, 1933, Serial No. 657,232

12 Claims. (Cl. 172—239)

This invention relates to control systems and more particularly to motor control systems.

In various control systems it is necessary to move a member to a predetermined position and to stop this member in that position without any overthrow or oscillating movement about said position. The present invention, therefore, has for its main object the provision of a novel and reliable arrangement which accomplishes this result and which is, nevertheless, simple and economical to manufacture.

In its more specific aspects, the invention includes a galvanometer which mechanically controls the adjustment of switching mechanism whereby a reversible motor is selectively operated to adjust a member to a predetermined point without overthrow and without oscillation about this point.

Referring to the drawings, Fig. 1 diagrammatically represents a simplified showing of the electrical circuits of an automatic recording pyrometer system; Fig. 2 is a diagrammatic showing of the electrical circuits and certain portions of the mechanical equipment employed in the pyrometer system; and Figs. 3 and 4 are respectively a front elevation and a plan view of the mechanism for operating a switching device under the control of a galvanometer needle.

Referring especially to Fig. 1, there is indicated a conventional potentiometer network generally designated 5, which includes the battery 6, the slide wire resistor 7, a stationary wiping contactor 8 engaging this resistor, the thermocouple 9, the galvanometer 10 and the resistors 11 and 12. An operating network, controlled in part by the potentiometer network includes a reversible A. C. series motor 13 having the field circuits 14 and 15 and the armature 16. The circuits of this motor are controlled by a switch generally designated S whereby the forward or reverse windings of the motor 13 are connected in circuit to govern the forward or reverse rotation of this motor. Across a portion of the operating network there is connected the primary winding 18 of transformer 17, being adjustably connected at tapped points such as 19a and 20a on the resistors 19 and 20, while the secondary winding 94 of this transformer is connected in series with a rectifier 93, the purpose for which will be hereinafter set forth.

By referring to Fig. 2, it will be noted that the reversible motor 13 has a fly-wheel 21 mounted on its shaft to retard the starting motion of the motor in order to prevent it from reaching a relatively high speed on very small temperature changes. The shaft 22 of the motor drives the worm 23 which engages the worm gear 24. This worm gear; which rotates on the axis 25, carries the slide wire resistor 7 to change the relation of this element with respect to the stationary wiper 8, and also carries a drum 26, which drives a metal tape 27 carrying stylus 28. The movement of this tape is guided by the rollers 29 and 30 to move the stylus 28 transversely across the chart 31, which is driven by a rotating roll 32 carried by the shaft 33. This shaft is driven by the worm gear 34 from worm 35 carried by the shaft 36 which, in turn, is driven by worm gear 37 and worm 38 actuated by the continuously operating synchronous motor 39. The shaft 36, which is thus continuously driven, carries the rotating cams 40, 41 and 42. As best shown in Fig. 3, the cam 40 operates the link 43 by a reciprocating motion. This link is provided with a slot 44 to receive the shaft 36 and is also provided with a roller or cam follower 45 to engage the periphery of the cam 40. The link 43 at its left end, as herein illustrated, is pivoted at 46 to an arm 47, the upper end of which is secured to one end of the sleeve 48 having a portion passing through a bearing in the supporting plate 49. At the other end of this sleeve, there is secured a cam plate 50 notched at its upper edge as indicated at 51 to engage a pin 52. The pin 52 is carried by a stepped lever 53 pivoted in a suitable support (not shown) at point 54. The left end of this lever is so shaped that its upper edge is formed with three steps shown as an upper portion 55, an intermediate portion 56 and a lower portion 57. As will be further pointed out, the stepped end of the lever 53 is engaged by the galvanometer needle 58 in its movement between the limiting stops 59. It will be noted that stops 59 are placed relatively close together, to restrict the swinging of the galvanometer needle to a very small movement in order that it may respond quickly. Thus these stops serve to keep the galvanometer needle very close to the center point between the stops, even in cases where in their absence the galvanometer needle would have a large deflection. By this arrangement the galvanometer needle can return to its center position in a minimum amount of time when the current through the galvanometer coil is reduced to zero. The right hand portion of the lever 53 has connected thereto a thin flat spring 60 which supports the notched shutter plate 61. It should be pointed out that the right hand end of the lever 53 is heavier than the left hand end so that when the pin 52 is not supported by the cam 50, the right end of the lever will drop until some one of the portions 55, 56 or 57 at the left end thereof rests against the galvanometer needle 58. As shown in Fig. 4, a plate 96 is supported on the upper ends of the stops 59, so that when the lever 53 is elevated to engage the end of the galvanometer needle, this needle, although it is elevated slightly, is held against abnormal upward movement by this plate.

It has been mentioned that the rotating shaft 36 carries cams 41 and 42. Cam 42 is engaged by the cam follower 71 mounted on the lever 72 which lever is pivoted at its right hand end on the shaft 64. The free end of the lever 72 is formed with steps as shown at 65a and 65b to engage the shutter plate 61. Near the free end of this lever there is provided a pin 73 which engages the slot 67 in the link 68. The upper end of this link is pivoted at 68a to the switch actuating arm 69 which arm is pivoted at 70. The cam 41 is engaged by the cam follower 62 carried by the lever 63 which is pivoted at its right end on the shaft 64. The free end of the lever 63 is formed with the steps the same in shape as those on the free end of the lever 72 and likewise cooperates with the shutter plate 61. Near the free end of the lever 63, there is likewise provided a pin 66 which is received in a slot 74 in the lower end of the link 75, the upper end of which link is pivoted at 75a to the arm 69. The free end of the arm 69 has a drum portion 76 provided with staggered projections 77, 78, 79 and 80 which engage, in different combinations, a series of normally open contactor springs 91a and 92a, etc., to bring them into closed condition.

By way of example, it is assumed that shaft 36, rotating at a speed of 60 R. P. M. will cause the left end of the lever 53 to be raised and lowered once every second, through the action of the members including the lever 43 and the cam plate 50 engaging the pin 52. This motion of the lever 53 takes place in about one quarter of a second and its left end remains in its lowered position about three quarters of a second. During this last interval of time the galvanometer needle 58 is free to swing and if the potentiometer network 5 is balanced, the galvanometer needle 58 willl remain in its intermediate position, that is, in the notch 57. If, however, the potentiometer network is unbalanced during this period of unrestricted swing of the galvanometer needle 58, this needle will be deflected to the left or to the right, as the case may be, until it rests against one of the stops 59. If it be assumed that the galvanometer needle has been deflected to the left, the lever 53 when next released under the action of cam plate 50 will contact with the galvanometer needle 58 at step 56. However, if the galvanometer needle is deflected to the right, the part 55 of the lever 53 will engage the galvanometer needle. Thus these three possible positions of the lever 53 provide three different ways of obstructing the motion of levers 63 and 72. The cams 41 and 42 are identical and hold the levers 63 and 72 in the position shown in Fig. 3 for the greater part of each of their revolutions, that is to say, for about seven-eighths of a second. During the remaining one-eighth of a second the notches in these cams permit the levers 63 and 72 to rotate upward around shaft 64 under the control of springs such as 82. This motion of these levers, however, can only take place when the two slots in the plate 49 are unrestricted by the shutter plate 61. It has been mentioned that the free end of each of the levers 63 and 72 is shaped so as to form two steps 65a and 65b, while the outer edge of the shutter plate 61 is so shaped that the levers 63 and 72 may operate in several different ways.

In the first shutter position shown in Figs. 3 and 4, both of the slots in plate 49 are partially obstructed so that the levers 63 and 72 may rotate a small angle until steps 65b, thereof rest against the shutter plate. In the second position of the shutter plate, the upper slot (Fig. 4) in plate 49 is unobstructed while the lower slot thereof is completely obstructed so that lever 72 passes completely through the slot while the step 65a of lever 63 rests against the shutter and keeps this lever in its original position. In the third position of the shutter plate, the last-named conditions with respect to the shutter plate are reversed, so that the lever 63 passes through the lower slot and lever 72 remains stationary. The notches in the cams 41 and 42 and in the cam 40 are so timed that the motion of the levers 63 and 72, requiring about one-eighth of a second, occurs within the quarter second period during which the shutter plate remains stationary in one of its three positions. The levers 63 and 72 respectively carry the pins 66 and 73 which ride in the slot 74 of link 75 and in the slot 67 of link 68. These links actuate switch arm 69, which is pivoted at 70 to rock the drum 76 with the projections 77 to 80 inclusive, to various positions, thereby closing various pairs of springs 91 and 92 (Fig. 2) to complete different circuit combinations in the networks of Figs. 1 and 2. The drum and the pairs of springs actuated thereby constitute a multiposition progressively movable switching means.

The operation of the system is as follows: As long as the potentiometer network 5 is balanced, the galvanometer needle 58 remains in the position shown in Fig. 4, that is, in engagement with the notch 57 of lever 53. With the lever 53 in this position, the levers 63 and 72 will actuate switch arm 69 with the result that either the projection 78 or 79 will be positioned to close contact between springs 92b and either spring 91c or 91d, while springs 92a and 92c are open so that the motor remains at rest.

However, if the temperature to which the thermocouple 9 is exposed, changes, the potential across this thermocouple changes and unbalances the potentiometer network thereby causing current to flow through the galvanometer coil and resistors 11 and 12 with the result that the galvanometer needle 58 will be deflected from its intermediate position. If it be assumed that the galvanometer needle is deflected toward the left, the switch drum 76 will be operated to close the two pairs of switch springs, 92c with 91e and 92a with 91a, as indicated in Fig. 1. The closing of these springs will immediately cause the motor 13 to operate in a circuit traceable from the alternating current source, conductor 95, spring 92a, spring 91a, motor field 14, armature 16, resistor 19, conductor 86, to the other side of the A. C. source. The motor 16 will rotate the slide wire resistor 7 with respect to the contact 8 in the proper direction until the potentiometer network is again balanced. On the establishing of this balanced condition, the needle 58 will then return to its intermediate position and consequently the switch arm through the action of links 68, 75 and the levers 63 and 72, will be moved to a position where the switch drum 76 will be restored to one of its intermediate positions to make contact between springs 91c and 92b. With the switch in this position, the operating circuit of the motor just described is interrupted and at the same time the motor is short-circuited over a path traceable from the lower terminal of the armature 16, conductor 87, spring 92b, spring 91c, field winding 15, and upper terminal of the armature, which circuit causes the motor to become a short-circuited generator, thereby acting as a powerful brake. Therefore, when the switch is moved to open the operating circuit of the motor, the motor will be stopped very quickly. In a similar manner, the reverse operation of the system is effected, that is, the motor 16 will operate in the opposite direction when the galvanometer needle 58 is deflected toward the right.

In order to prevent overthrow of the stylus 28, an anticipating arrangement is provided in the system of this invention. As herein disclosed, this arrangement consists of an auxiliary circuit including the resistors 19 and 20 which are tapped at the points 19a and 20a for connection with the primary winding 18 of a small transformer 17. The secondary winding 94 of this transformer is connected in series with rectifier 93 and through springs 92c and springs 91e or 91f with either resistors 11 or 12. It will be understood that the primary winding of the transformer 17 is energized through the potential difference between the taps 19a and 20a. The current thus induced in the secondary winding of this transformer after passing through the rectifier 93 and the springs 92c in engagement with spring 91e or 91f through either the resistor 11 or 12, flows back to the secondary winding 94 of the transformer. If, for example, spring 92c is in engagement with spring 91e, current flowing in the last described anticipating circuit including the resistor 11, will develop a difference in potential across this resistor in the same direction as the difference of potential set up across this resistor, due to current flowing therethrough in the previously mentioned circuit including thermocouple 9, the resistors 12 and 11 and the galvanometer coil. The difference in potential established by the anticipating circuit and the resulting current, increase the difference in potential across the resistor 11 and thereby decrease the current through the thermocouple 9 and the galvanometer 10, so that the galvanometer needle swings to its zero position sooner than it would otherwise. The connections are so made that this anticipatory effect will always tend to advance the galvanometer needle 58 toward its normal intermediate position, so that the needle will reach this position a short time before the potentiometer slide wire 7 has reached the balance point. Through the switch mechanism previously described, the motor operating circuit will be opened before the balance point is reached, but the motor will continue to operate due to the inertia of the armature 16, until the braking action resulting from the short circuit, as well as friction of all of the moving parts bring it to a stop. The anticipatory arrangement should be so designed as to bring the motor from full speed to a complete stop either at the exact balance point of the slide wire or very slightly before this point is reached.

It will be appreciated that with small deflections of short duration of the galvanometer needle 58, the motor does not reach full speed and the motor current is therefore higher than the full speed current. However, as the motor speed increases, the motor current decreases and will cause a corresponding change in the difference of potential between the taps 19a and 20a. Consequently, the potential in the anticipatory circuit will vary gradually and by selecting proper resistance values for resistors 19 and 20 and with suitable location of the taps 19a and 20a, the anticipatory effect can be so designed as to operate effectively for large as well as for small galvanometer deflections. From the foregoing disclosure it will be seen that the mechanical devices forming a part of this invention are of rugged construction, and include unusually few parts requiring close manufacturing tolerances or fine adjustment. Furthermore, while a mechanical amplifier is actuated by the galvanometer needle, the construction is such that very little strain is placed on the galvanometer needle.

The present disclosure is merely typical of one of the many possible forms of the invention which is not to be limited to any specific structure, except as specifically defined in the following claims.

I claim:

1. The method of restoring the balance of a normally balanced electrical system which comprises adjusting said system in response to a lack of balance thereof and in such a manner as to decrease the lack of balance until a balanced condition is reestablished, while in the course of decreasing the lack of balance simultaneously further decreasing the unbalance of the system by periodically determining the unbalance of the system and employing the unbalance thereof to control the switching of a balancing component into the system.

2. The method of restoring the balance of an electrical system unbalanced by a change of an electromotive force therein which comprises adjusting said system in response to the lack of balance thereof and in such a manner as to decrease said electromotive force until a balanced condition is reestablished, while in the course of reestablishing said balanced condition simultaneously further decreasing the effect of said electromotive force by developing an electromotive force of opposite effect from said first-mentioned electromotive force and controlling the switching of said last-mentioned electromotive force into said system in response to a periodic determination of the lack of balance of said system.

3. In an arrangement of the class described, a normally balanced electrical system including a galvanometer, means responsive to a changed condition for disturbing the balance of said system, said galvanometer being actuated by the lack of balance of said system, a member movable to restore the balance of said system, a motor for operating said member, progressively movable switching means mechanically actuated by said galvanometer to control the flow of current to said motor, and an anticipating circuit also controlled by said switching means and normally serving to decrease the lack of balance of said balanced system, said anticipating circuit including a rectifier and means for supplying current through said rectifier proportional to the flow of current through said motor.

4. In an arrangement of the class described, a normally balanced electrical system, means therein responsive to a changed condition for disturbing the balance of said system, a galvanometer connected in said system and responsive to the lack of balance therein, a reversible motor having a forward and a reverse field winding operable to adjust said system to restore the balance thereof, rotatable switching means mechanically controlled by said galvanometer, and a circuit completed by said switching means through one winding of said motor to adjust said system toward a balanced condition, said switching means being responsive to an approximate restoration of the balance of said system for interrupting the operating circuit of said motor and for completing a second circuit therefor through its other field winding for stopping said motor.

5. In an arrangement of the class described, a normally balanced electrical system, means therein responsive to a changed condition for disturbing the balance of said system, a galvanometer connected in said system and responsive to the lack of balance therein, an anticipating circuit for decreasing said lack of balance, a reversible motor having a forward and a reverse field winding operable to adjust said system to restore the balance thereof, selectively rotatable switching means mechanically controlled by said galvanometer, a circuit completed by said switching means through one winding of said motor to adjust said system toward a balanced condition, said switching means being responsive to an approximate restoration of the balance of said network for interrupting the operating circuit of said motor and for completing a circuit therefor through its other field winding for stopping said motor.

6. In an arrangement of the class described, a normally balanced system including a galvanometer provided with a needle, means for disturbing the balance of said system, a member movable to balance said system at a new balance point, a reversible motor for adjusting said member, and progressively movable rotatable switching means mechanically controlled by said galvanometer needle for completing operating circuits for said motor.

7. In an arrangement of the class described, a normally balanced system including a galvanometer needle, means for disturbing the balance of said system whereby said galvanometer is operated in response to said lack of balance, a movable member, operating means including a reversible motor and circuits therefor to move said member to restore the balance of said system, and reversible multi-position switching means mechanically responsive to said galvanometer needle for selectively completing said circuits.

8. In a system of the class described, a normally balanced network including means for disturbing the balance of said network and a galvanometer to indicate the lack of balance thereof, a member adjustable to decrease the lack of balance of said network, means for additionally decreasing the unbalance of said network, a reversible motor for operating said member, means including selectively movable multi-position switching means mechanically controlled by said galvanometer, said first-mentioned means being controlled by said switching means, and circuits selectively completed by said switching means for controlling the operation of said motor.

9. In a system of the class described, a normally balanced network including means for disturbing the balance of said network and a galvanometer to indicate the lack of balance thereof, a member adjustable to decrease the lack of balance of said network until a balanced condition is reestablished, anticipating means for additionally decreasing the unbalance of said network, a reversible motor for operating said member, means including a progressively movable switching mechanism, periodically and mechanically controlled by said galvanometer, said anticipating means being controlled by said switching mechanism, and circuits selectively completed by said switching means for controlling the operation of said motor.

10. In an arrangement of the class described, a normally balanced system including a galvanometer provided with a movable needle, means for disturbing the balance of said system whereby said galvanometer needle is operated in response to said lack of balance, mechanism for periodically determining the position of said galvanometer needle, reversible, selectively rotatable, multiposition switching means controlled by said mechanism, a movable member, and operating means including a reversible motor and circuits therefor to move said member to restore the balance of said system, said circuits being completed by said switching means.

11. In an arrangement of the class described, a normally balanced system, a galvanometer provided with a needle, said galvanometer being connected across normally neutral points of said system, means for disturbing the balance of said system whereby said galvanometer needle is operated, reversibly movable multiposition switching means, mechanism for translating motion of the galvanometer needle into corresponding movement of said switching means, a movable member, operating means for said member including a reversible motor and circuits therefor controlled by said switching means whereby said motor moves said member to restore the balance of said system.

12. In an arrangement of the class described, a normally balanced system having a galvanometer connected across neutral points thereof, said galvanometer being provided with a needle, means for disturbing the balance of said system whereby said galvanometer needle is operated to indicate a lack of balance, a reversibly rotatable multiposition switching device, a mechanical amplifier for translating the movement of the galvanometer needle into an amplified force for effecting a corresponding movement of said switching device, a movable member, operating means for said member including a reversible motor and circuits therefor controlled by said switching device whereby said motor moves said member to restore the balance of said system.

KARL H. HUBBARD.